US009197002B2

(12) United States Patent
Satoh et al.

(10) Patent No.: US 9,197,002 B2
(45) Date of Patent: Nov. 24, 2015

(54) CONNECTOR SUPPORTING STRUCTURE AND CONNECTOR-EQUIPPED ELECTRONIC DEVICE

(71) Applicant: Hitachi Metals, Ltd., Tokyo (JP)

(72) Inventors: Masataka Satoh, Hitachi (JP); Kouki Hirano, Hitachinaka (JP); Hitoshi Horita, Kawasaki (JP); Masanobu Ito, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 3 days.

(21) Appl. No.: 14/169,214

(22) Filed: Jan. 31, 2014

(65) Prior Publication Data
US 2014/0227908 A1 Aug. 14, 2014

(30) Foreign Application Priority Data

Feb. 8, 2013 (JP) ................................. 2013-022919

(51) Int. Cl.
*H01R 13/516* (2006.01)
*G02B 6/42* (2006.01)
*H01R 12/72* (2011.01)

(52) U.S. Cl.
CPC ............ *H01R 13/516* (2013.01); *G02B 6/4284* (2013.01); *G02B 6/4293* (2013.01); *H01R 12/724* (2013.01)

(58) Field of Classification Search
CPC ... H05K 5/0069; H05K 5/0052; H01R 13/516
USPC ........................................................ 439/76.1
See application file for complete search history.

(56) References Cited

U.S. PATENT DOCUMENTS

| 4,047,242 | A  | * | 9/1977  | Jakob et al.      | 361/714  |
|-----------|----|---|---------|-------------------|----------|
| 5,392,197 | A  | * | 2/1995  | Cuntz et al.      | 361/818  |
| 5,473,109 | A  | * | 12/1995 | Plankl et al.     | 174/363  |
| 5,978,226 | A  | * | 11/1999 | Thomas et al.     | 361/707  |
| 6,407,925 | B1 | * | 6/2002  | Kobayashi et al.  | 361/752  |
| 6,434,013 | B2 | * | 8/2002  | Kitamura et al.   | 361/752  |
| 6,511,329 | B2 | * | 1/2003  | Yi-Tsung          | 439/76.1 |
| 6,573,448 | B2 | * | 6/2003  | Mayer et al.      | 174/481  |
| 6,707,678 | B2 | * | 3/2004  | Kobayashi et al.  | 361/752  |
| 6,927,337 | B2 | * | 8/2005  | Kobayashi et al.  | 174/535  |
| 7,094,075 | B1 | * | 8/2006  | Lim et al.        | 439/79   |
| 7,095,615 | B2 | * | 8/2006  | Nichols           | 361/719  |
| 7,144,275 | B2 | * | 12/2006 | Iida              | 439/587  |
| 7,209,360 | B1 | * | 4/2007  | Yarza             | 361/752  |
| 7,227,757 | B2 | * | 6/2007  | Mizutani          | 361/752  |
| 7,249,957 | B2 | * | 7/2007  | Watanabe et al.   | 439/79   |
| 7,390,199 | B2 | * | 6/2008  | Honda et al.      | 439/78   |
| 7,419,385 | B2 | * | 9/2008  | Itou et al.       | 439/76.1 |
| 7,436,677 | B2 | * | 10/2008 | Noritsune et al.  | 361/752  |
| 7,561,435 | B2 | * | 7/2009  | Kamoshida et al.  | 361/752  |

(Continued)

FOREIGN PATENT DOCUMENTS

JP 2009-205944 9/2009

*Primary Examiner* — Ross Gushi
(74) *Attorney, Agent, or Firm* — Roberts Mlotkowski Safran & Cole P.C.

(57) ABSTRACT

A connector supporting structure includes a substrate, a connector mounted on the substrate, and a casing covering at least a portion of the substrate and supporting the connector. The casing includes an opening to expose a part of the connector from an inside of the casing to an outside. Side surfaces of the connector are pressed by inner surfaces of the opening.

4 Claims, 6 Drawing Sheets

(56) References Cited

U.S. PATENT DOCUMENTS

| | | | |
|---|---|---|---|
| 7,652,892 B2 * | 1/2010 | Shiu et al. | 361/752 |
| 7,697,300 B2 * | 4/2010 | Brandt et al. | 361/736 |
| 7,744,381 B2 * | 6/2010 | Honda | 439/79 |
| 7,791,888 B2 * | 9/2010 | Tominaga et al. | 361/708 |
| 7,891,990 B1 * | 2/2011 | Gao et al. | 439/79 |
| 8,014,158 B2 * | 9/2011 | Kojima | 361/752 |
| 8,023,273 B2 * | 9/2011 | Chlumsky et al. | 361/752 |
| 8,038,914 B2 * | 10/2011 | Suzuki et al. | 264/46.4 |
| 8,071,895 B2 * | 12/2011 | Shiu et al. | 174/521 |
| 8,139,364 B2 * | 3/2012 | Wickett | 361/752 |
| 8,305,763 B2 * | 11/2012 | Kato | 361/752 |
| 8,356,762 B2 * | 1/2013 | Tomikawa et al. | 237/12.3 R |
| 8,357,015 B2 * | 1/2013 | Kohmura et al. | 439/736 |
| 8,505,891 B2 * | 8/2013 | Guyenot et al. | 269/22 |
| 8,545,238 B2 * | 10/2013 | Takeda et al. | 439/76.1 |
| 8,611,704 B2 * | 12/2013 | Yasuda et al. | 385/14 |
| 8,657,609 B2 * | 2/2014 | Yanagisawa et al. | 439/79 |
| 8,670,240 B2 * | 3/2014 | Hashimoto et al. | 361/720 |
| 8,698,264 B2 * | 4/2014 | Hirano et al. | 257/433 |
| 8,699,231 B2 * | 4/2014 | Shinoda | 361/752 |
| 8,738,097 B2 * | 5/2014 | Hong | 455/575.1 |
| 8,746,988 B2 * | 6/2014 | Yu et al. | 385/86 |
| 8,770,989 B2 * | 7/2014 | Ohhashi et al. | 439/76.1 |
| 8,942,001 B2 * | 1/2015 | Kawai et al. | 361/752 |
| 8,961,195 B2 * | 2/2015 | Wu | 439/76.1 |
| 2001/0017766 A1 * | 8/2001 | Murowaki et al. | 361/752 |
| 2002/0119697 A1 * | 8/2002 | Chan | 439/519 |
| 2002/0146937 A1 * | 10/2002 | Yi-Tsung | 439/587 |
| 2002/0186551 A1 * | 12/2002 | Murowaki et al. | 361/752 |
| 2003/0049954 A1 * | 3/2003 | Lin et al. | 439/76.1 |
| 2005/0020104 A1 * | 1/2005 | Yamamoto et al. | 439/76.1 |
| 2005/0047095 A1 * | 3/2005 | Tomikawa et al. | 361/715 |
| 2005/0105253 A1 * | 5/2005 | Sakai | 361/679 |
| 2006/0046535 A1 * | 3/2006 | Iida | 439/76.1 |
| 2007/0072452 A1 * | 3/2007 | Inagaki et al. | 439/76.2 |
| 2007/0134951 A1 * | 6/2007 | Inagaki et al. | 439/74 |
| 2007/0195504 A1 * | 8/2007 | Tomikawa et al. | 361/715 |
| 2007/0215614 A1 * | 9/2007 | Matsui | 220/3.2 |
| 2009/0068862 A1 * | 3/2009 | Honda | 439/78 |
| 2010/0255732 A1 * | 10/2010 | Kohmura et al. | 439/733.1 |
| 2011/0136352 A1 * | 6/2011 | Liu et al. | 439/76.1 |
| 2014/0080329 A1 * | 3/2014 | Yamanaka et al. | 439/76.1 |
| 2014/0227908 A1 * | 8/2014 | Satoh et al. | 439/620.15 |

* cited by examiner

| 211Aa RAISED PORTION |

FIG.7B

| 211Ba INCLINED SURFACE
219a SMALL DIAMETER PORTION
219b LARGE DIAMETER PORTION |

CONNECTOR SUPPORTING STRUCTURE AND CONNECTOR-EQUIPPED ELECTRONIC DEVICE

The present application is based on Japanese patent application No. 2013-022919 filed on Feb. 8, 2013, the entire contents of which are incorporated herein by reference.

BACKGROUND OF THE INVENTION

1. Field of the Invention

The invention relates to a connector supporting structure to support a connector mounted on a substrate and a connector-equipped electronic device (which employs the connector supporting structure) with an electronic component(s) mounted on the substrate as well as the connector.

2. Description of the Related Art

An electronic device is known in which a connector and electronic components such as integrated circuit or transistor are mounted on a wiring pattern of a circuit board and a casing member is provided to enclose a portion of the connector and the electronic components (see, e.g., JP-A-2009-205944).

The electronic device disclosed in JP-A-2009-205944 is connected to an external equipment via a cable by fitting a cable-side connector to a device-side connector mounted on the circuit board. The device-side connector is provided with a connector housing (base portion) having a housing space formed therein and a pair of connecting terminals housed in the housing space. The pair of connecting terminals is provided such that one end is connected to a terminal of the cable-side connector and another end is bent toward the circuit board so as to pass through a though-hole formed on the circuit board and is solder-connected to the wiring pattern provided on the back side of the circuit board.

The connector housing has four rod-like terminals which protrude respectively from four corners of a bottom portion toward the circuit board. The rod-like terminals pass through through-holes formed on the circuit board and are solder-connected to a ground pattern provided on the back side of the circuit board. The casing member has a rectangular parallelepiped shape which is composed of an upper wall facing the circuit board and sidewalls surrounding the upper wall so as to open on the circuit board side. A opening is formed on the sidewall by cutting out a portion thereof so as to let the connector housing pass therethrough and a thin plate-like wall is thus formed in the periphery of the opening.

An electronic device in the first embodiment of JP-A 2009-205944 has the connector housing integral with a flange protruding outward from an outer peripheral wall except the bottom portion. When the casing member is mounted on the circuit board so that the opening covers over the outer peripheral wall of the connector housing, the flange comes into surface-contact with the wall portion around the opening from the outside of the casing member. This allows the outer surface of the wall portion of the casing member to receive a force applied to the device-side connector at the time of fitting the cable-side connector.

Meanwhile, an electronic device in the second embodiment of JP-A-2009-205944, has a depressed portion as a recessed groove that is formed across the outer peripheral wall of the connector housing. When the casing member is mounted on the circuit board so that the opening covers over the outer peripheral wall of the connector housing, the wall portion around the opening is fitted to the depressed portion. Thus, the wall portion is sandwiched in the thickness direction thereof by a pair of facing walls of the depressed portion. One of the pair of facing walls which is located inside of the casing member comes into surface-contact with the wall portion from the inside of the casing member. This allows the inner surface of the wall portion of the casing member to receive a force applied to the device-side connector at the time of pulling out the cable-side connector.

SUMMARY OF THE INVENTION

In the electronic device disclosed in JP-A-2009-205944, if the connector housing is provided with the flange, the force applied at the time of fitting the cable-side connector to the device-side connector can be received by the casing member but the force applied at the time of pulling out the cable-side connector from the device-side connector cannot be received by the casing member. On the other hand, in the above electronic device, even if the depressed portion is formed on the casing member, the force applied at the time of pulling out the cable-side connector from the device-side connector can be received by the casing member but the force applied at the time of fitting the cable-side connector to the device-side connector cannot be received by the casing member since there is a gap between the depressed portion and the wall. Thus, the casing member can receive only either the force applied at the time of fitting the cable-side connector to the device-side connector or the force applied at the time of pulling out the cable-side connector from the device-side connector. Therefore, in case that the cable-side connector is repeatedly fitted to and removed from the device-side connector, connecting portions between the connecting terminals/rod-like terminals of the device-side connector and the wiring pattern (ground pattern) of the circuit board may be damaged.

It is an object of the invention to provide a connector supporting structure that a force applied at the time of fitting to and removing from another connector can be received by a casing member, as well as a connector-equipped electronic device employing the connector supporting structure.

(1) According to one embodiment of the invention, a connector supporting structure comprises:
a substrate;
a connector mounted on the substrate; and
a casing covering at least a portion of the substrate and supporting the connector,
wherein the casing comprises an opening to expose a part of the connector from an inside of the casing to an outside, and
wherein side surfaces of the connector are pressed by inner surfaces of the opening.

(2) According to another embodiment of the invention, a connector-equipped electronic device comprises:
a substrate with a wiring pattern formed thereon;
an electronic component mounted on the substrate;
a connector mounted on the substrate; and
a casing covering at least a portion of the substrate and supporting the connector,
wherein the casing comprises an opening to expose a part of the connector from an inside of the casing to an outside, and
wherein side surfaces of the connector are pressed by inner surfaces of the opening.

Effects of the Invention

According to one embodiment of the invention, a connector supporting structure can be provided that a force applied at the time of fitting to and removing from another connector can be received by a casing member, as well as a connector-equipped electronic device employing the connector supporting structure.

BRIEF DESCRIPTION OF THE DRAWINGS

Next, the present invention will be explained in more detail in conjunction with appended drawings, wherein:

FIGS. 4A and 4B show an upper casing member, wherein

FIGS. 5A and 5B are side views showing the photoelectric conversion device with connector as viewed from the communication cable side, wherein

DETAILED DESCRIPTION OF THE PREFERRED EMBODIMENTS

Embodiments

A configuration of an active optical cable provided with a photoelectric conversion device with connector in an embodiment of the invention will be described in reference to FIGS. 1 to 3.

Figure 1:
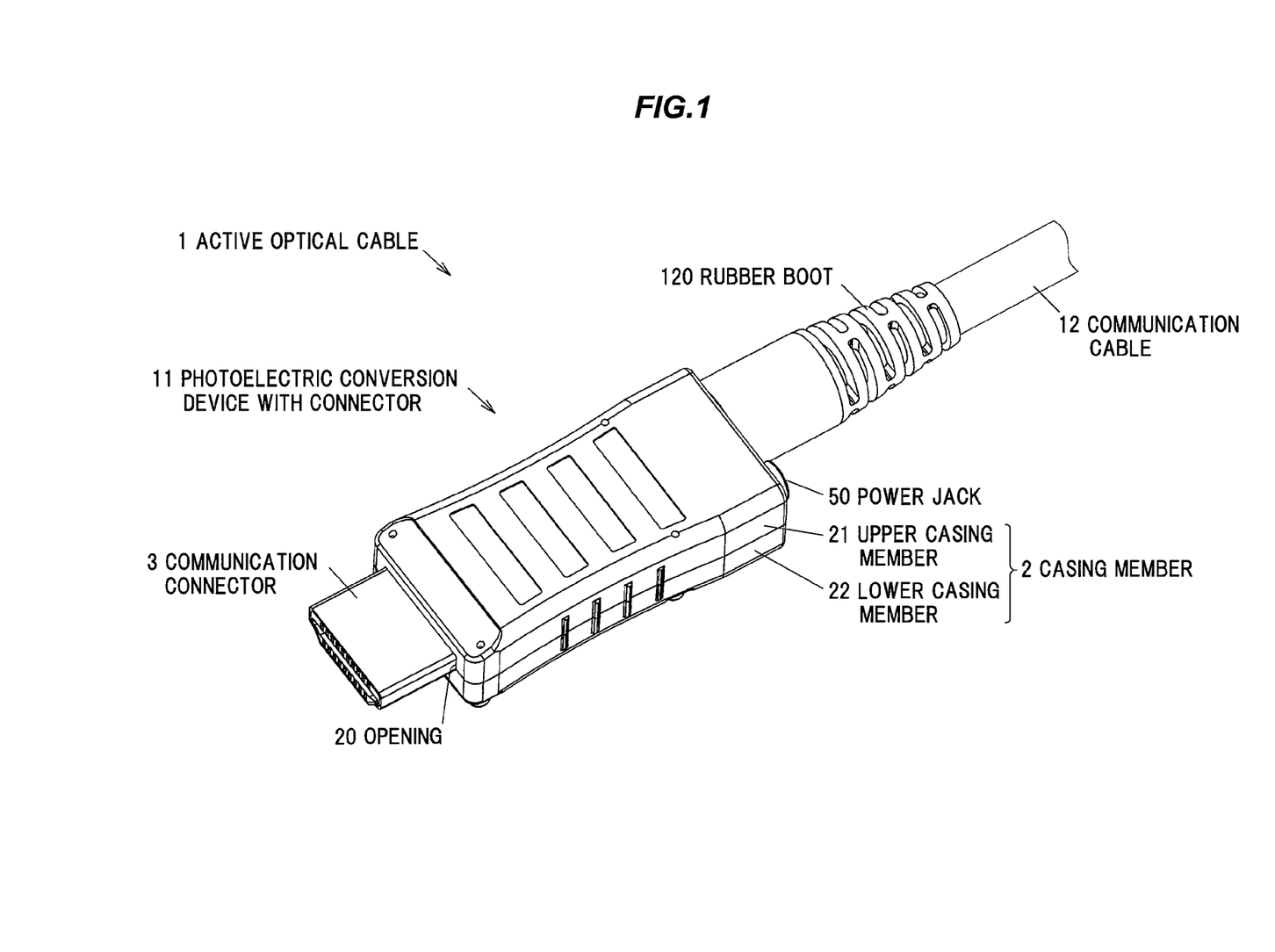
FIG. 1 is a perspective view showing a structural example of an active optical cable provided with a photoelectric conversion device with connector in an embodiment of the present invention.
Figure 2:
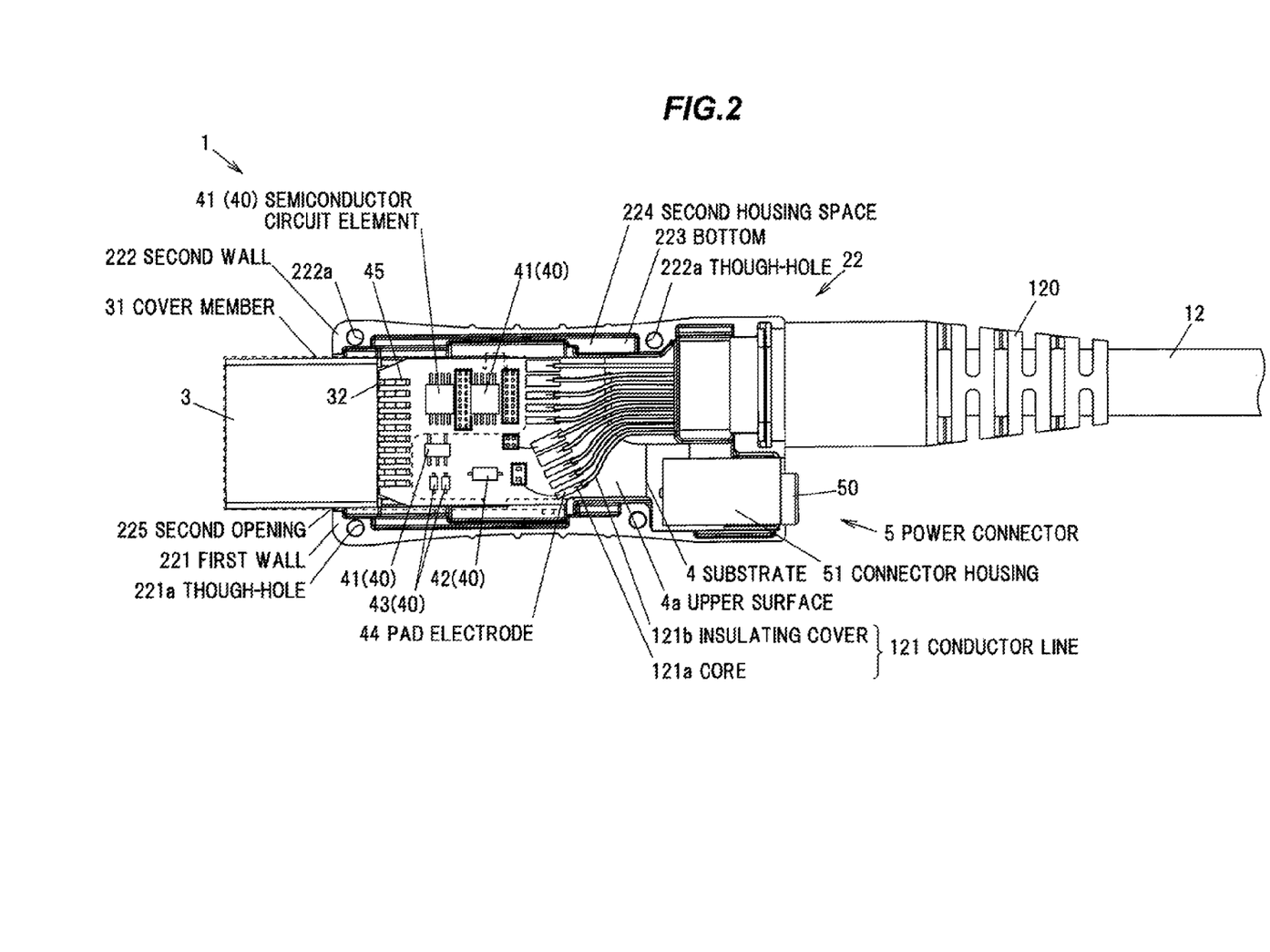
FIG. 2 is a plan view showing an example of component structure of the photoelectric conversion device with connector.

FIG. 1 is a perspective view showing a structural example of an active optical cable 1 provided with a photoelectric conversion device with connector 11 in an embodiment of the present invention. FIG. 2 is a plan view showing an example of component structure of the photoelectric conversion device with connector 11. FIG. 3 is a plan view showing a power connector 5 and a circuit board 4 therearound as viewed from the back side of the circuit board 4.

The active optical cable 1 is a HDMI (trademark: High Definition Multimedia Interface) cable used for connection between, e.g., digital audio-visual equipments. The active optical cable 1 is provided with a communication cable 12 including an optical fiber cable and a pair of the photoelectric conversion devices with connector 11 provided at both ends of the communication cable 12. Note that, FIG. 1 shows only one of the pair of the photoelectric conversion devices with connector 11.

The photoelectric conversion device with connector 11 is provided with the circuit board 4 having wiring patterns formed respectively on an upper surface 4a (see FIG. 2) and a lower surface 4b (see FIG. 3), plural electronic components 40 mounted on the circuit board 4, the power connector 5 mounted together with the plural electronic components 40 on the upper surface 4a of the circuit board 4, and a casing member 2 as a casing formed by fitting together an upper casing member 21 and a lower casing member 22 which are formed of a conductive metal. The circuit board 4, the plural electronic components 40 and a portion of the power connector 5 are housed in a housing space formed by fitting together the upper casing member 21 and the lower casing member 22.

As shown in FIG. 1, the communication cable 12 is drawn out from a rubber boot 120 which protrudes from an end portion of the casing member 2 toward the outside. The casing member 2 also has an opening 20 at another end portion (an end portion opposite to the rubber boot 120), and a communication connector 3 to be connected to a socket of a non-illustrated digital audio-visual equipment is exposed from the inside of the casing member 2 to the outside through the opening 20.

The circuit board 4 is, e.g., a glass epoxy substrate in which wiring patterns including plural lands 491 and 492 (see FIG. 3) are formed on a plate-like substrate made of glass fiber impregnated with epoxy resin and then subjected to thermo-setting treatment. As shown in FIG. 2, the plural electronic components 40, e.g., semiconductor circuit elements 41, a diode 42 and capacitors 43, etc, and the power connector 5 are mounted on the upper surface 4a of the circuit board 4.

Plural electrodes 45 connected to plural connecting terminals 32 of the communication connector 3 are formed on the upper surface 4a of the circuit board 4 at an end portion on the communication connector 3 side. The communication connector 3, the plural connecting terminals 32, the plural electrodes 45 of the circuit board 4 and some of the plural electronic components 40 are covered with a metal cover member 31. Note that, the cover member 31 is indicated by a dashed line in FIG. 2.

The power connector 5, to/from which a plug-shaped connector of a non-illustrated power cable is attached/detached (inserted/pulled out), is mounted on the upper surface 4a of the circuit board 4 at an end portion opposite to the communication connector 3. The power connector 5 has a resin connector housing 51 and a power jack 50 to/from which the connector of the power cable is attached/detached. The power jack 50 is exposed from the casing member 2 to the outside.

Figure 3:
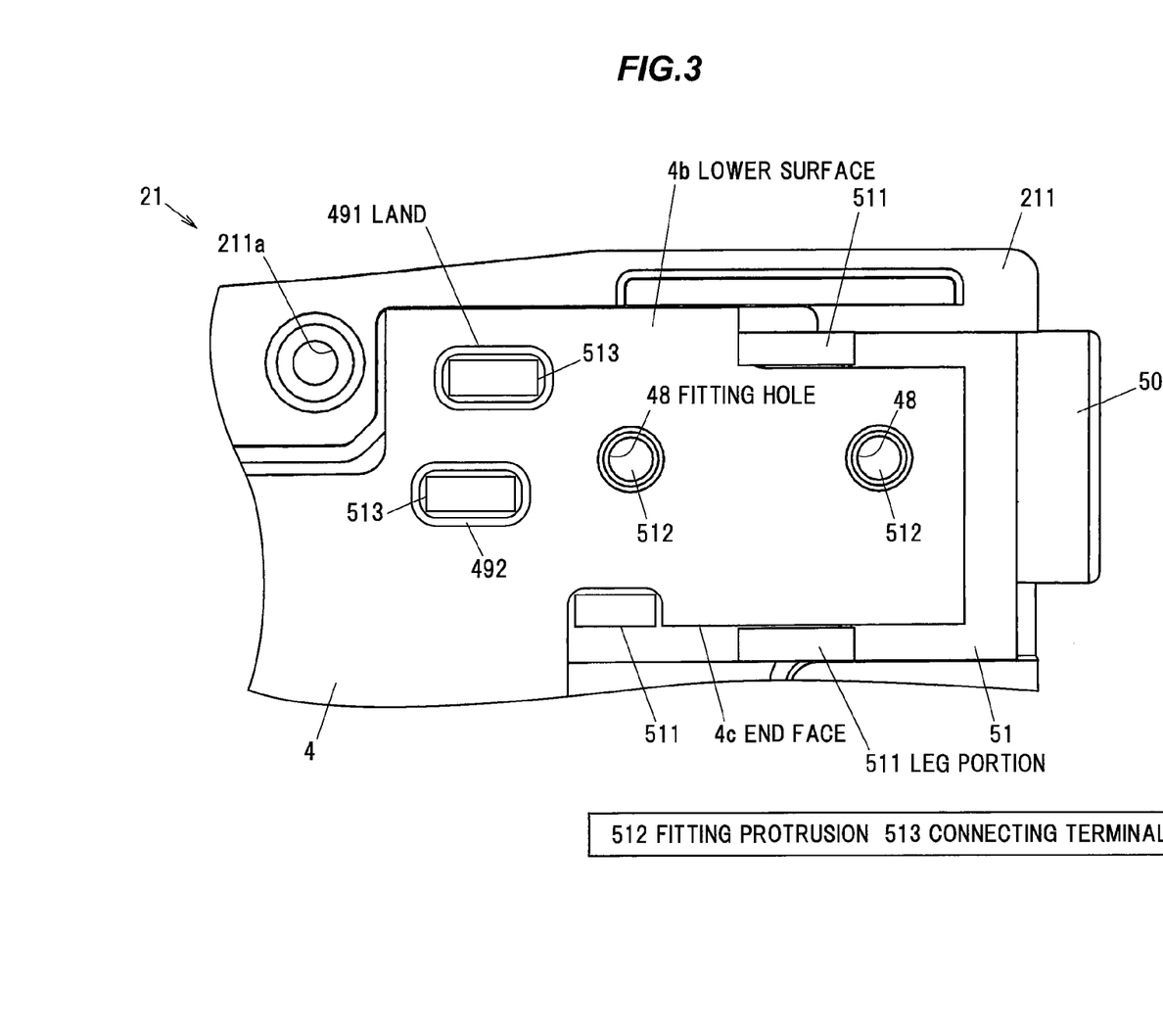
FIG. 3 is a plan view showing a power connector and a circuit board therearound as viewed from the back side of the circuit board.

As shown in FIG. 3, the connector housing 51 of the power connector 5 has plural metal leg portions 511 (three in the present embodiment), plural fitting protrusions 512 (two in the present embodiment) protruding toward the circuit board 4 and a pair of connecting terminals 513. The plural fitting protrusions 512 are fitted into plural fitting holes 48 (two in the present embodiment) formed on the circuit board 4. Thus, the connector housing 51 is positioned with respect to the circuit board 4. Meanwhile, outer surfaces of the plural leg portions 511 are in contact with an end face 4c of the circuit board 4. This suppresses rattling of the power connector 5 in a direction parallel to the circuit board 4 as well as orthogonal to an attaching/detaching direction of the connector of the power cable.

One of the pair of connecting terminals 513 is solder-connected to the land 491 connected to a power line-wiring pattern of the circuit board 4 and another is solder-connected to the land 492 connected to the ground pattern of the circuit board 4.

The communication cable 12 is composed of a non-illustrated optical fiber cable and plural conductor lines 121 (ten in the present embodiment). Each of the plural conductor lines 121 has a core 121a and an insulating cover 121b covering the core 121a. At a tip of each of the plural conductor lines 121, the core 121a is exposed from the insulating cover 121b. The exposed cores 121a are solder-connected to plural pad electrodes 44 (ten in the present embodiment).

The optical fiber cable is optically coupled to a non-illustrated photoelectric conversion element mounted on the lower surface 4b of the circuit board 4 (see FIG. 3). The photoelectric conversion element is an element which converts an electric signal into an optical signal or an optical signal into an electric signal. Examples of the former which is a light-emitting element include a laser diode and a VCSEL (Vertical Cavity Surface Emitting Laser), etc. Meanwhile, examples of the latter which is a light-receiving element include a photodiode. The photoelectric conversion element is configured to emit light toward the optical fiber or to receive light from the optical fiber.

When the photoelectric conversion element is an element which converts an electric signal into an optical signal, the semiconductor circuit element 41 mounted on the upper surface 4a of the circuit board 4 is a driver IC which drives the photoelectric conversion element based on an electric signal input from the electronic circuit board. On the other hand, when the photoelectric conversion element is an element which converts the received optical signal into an electric signal, the semiconductor circuit element 41 is a receiver IC which amplifies an electric signal input from the photoelectric conversion element and outputs the amplified electric signal to the electronic circuit.

The lower casing member 22 constituting the casing member 2 has integrally a first wall 221, a second wall 222 and a bottom 223 which connects the first wall 221 to the second wall 222. The lower casing member 22 opens on the circuit board 4 side (on the opposite side to the bottom 223). A second housing space 224 is formed between the first wall 221 and the second wall 222. The second housing space 224 mainly houses the plural electronic components 40 mounted on the lower surface 4b of the circuit board 4. A housing space of the casing member 2 is formed by combining the second housing space 224 with a below-described first housing space 217.

Plural though-holes 221a (two in the present embodiment) are formed on the first wall 221. Likewise, plural through-holes 222a (two in the present embodiment) are formed on the second wall 222. Non-illustrated bolts for assembling the upper casing member 21 with the lower casing member 22 pass through the though-holes 221a and 222a.

The communication cable 12 and the power connector 5 are arranged side-by-side along a width direction of the lower casing member 22 (an alignment direction of the first wall 221 and the second wall 222). The lower casing member 22 also has a second opening 225 at an end portion opposite to the communication cable 12 and the power connector 5. The opening 20 of the casing member 2 is formed by combining the second opening 225 with a below-described first opening 216.

Figure 4A:
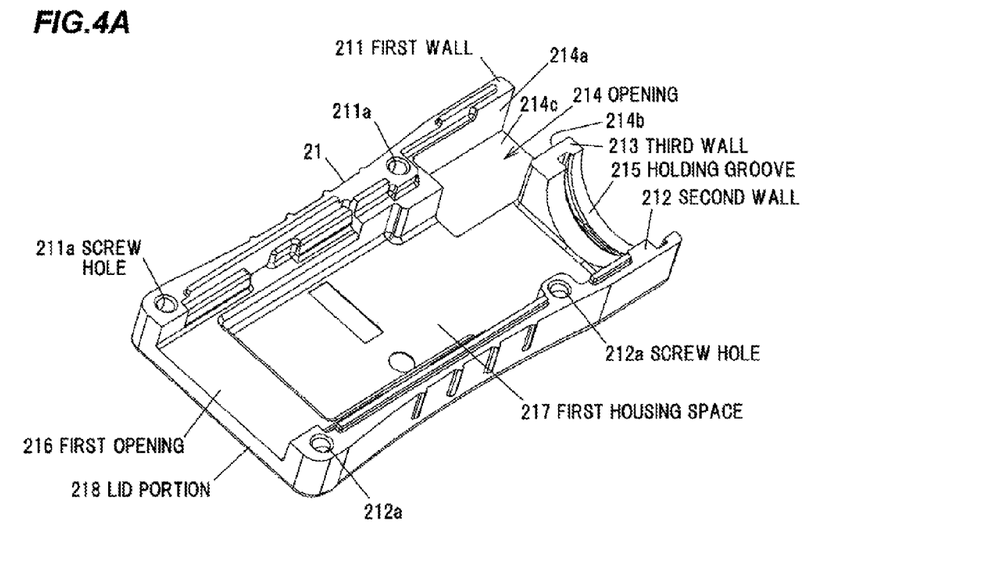
FIG. 4A is a perspective view and FIG. 4B is a side view on a communication cable side.
Figure 4B:
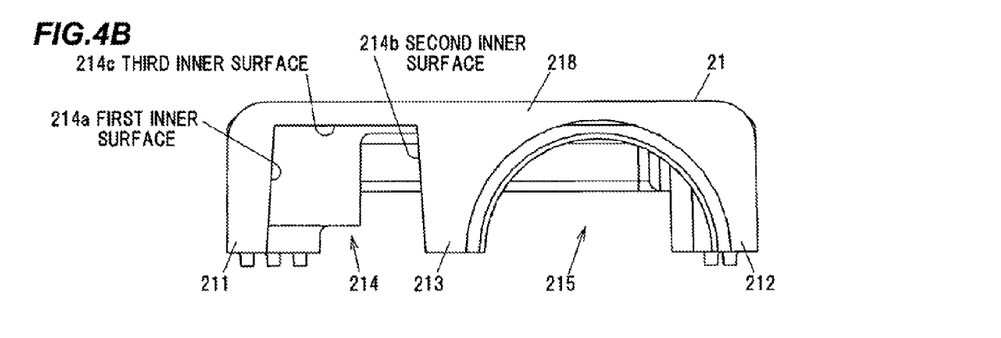

FIGS. 4A and 4B show the upper casing member 21, wherein FIG. 4A is a perspective view and FIG. 4B is a side view on the communication cable 12 side.

The upper casing member 21 constituting the casing member 2 has integrally a first wall 211, a second wall 212 and a lid portion 218 which connects the first wall 211 to the second wall 212. The upper casing member 21 opens on the circuit board 4 side (on the opposite side to the lid portion 218). The first housing space 217 to be combined with the second housing space 224 of the lower casing member 22 is formed between the first wall 211 and the second wall 212. The first housing space 217 mainly houses the plural electronic components 40 mounted on the upper surface 4a of the circuit board 4 and the power connector 5.

Plural screw holes 211a (two in the present embodiment) are formed n the first wall 211 so as to extend toward the lid portion 218. Likewise, plural screw holes 212a (two in the present embodiment) are formed on the second wall 212 so as to extend toward the lid portion 218. Non-illustrated bolts for assembling the upper casing member 21 with the lower casing member 22 are inserted into the screw holes 211a and 212a. The first opening 216 to be combined with the second opening 225 of the lower casing member 22 is provided at an end portion of the upper casing member 21.

At an end portion of the first housing space 217 opposite to the first opening 216, a third wall 213 is provided upright so as to protrude in a direction crossing the lid portion 218. The third wall 213 is arranged between the first wall 211 and the second wall 212. A opening 214 is formed between the first wall 211 and the third wall 213 so that a portion of the power connector 5 is exposed from the inside of the casing member 2 to the outside. An arcuate holding groove 215 for holding the communication cable 12 is formed between the second wall 212 and the third wall 213. The opening 214 and the holding groove 215 are arranged side-by-side in a width direction of the upper casing member 21 (in a direction parallel to the circuit board 4 as well as orthogonal to an extending direction of the communication cable 12).

The opening 214 has a first inner surface 214a, a second inner surface 214b and a third inner surface 214c. The first inner surface 214a is formed on the first wall 211 side, the second inner surface 214b is formed on the third wall 213 side and the third inner surface 214c is formed on the lid portion 218 side. As shown in FIG. 4B, the first inner surface 214a and the second inner surface 214b are provided with a tapered shape in which a distance between the first inner surface 214a on the first wall 211 side and the second inner surface 214b on the third wall 213 side decreases toward the lid portion 218.

The shape of the opening 214 and assembly of the photoelectric conversion device with connector 11 will be described in more detail below in reference to FIGS. 5A to 6.

Figure 5A:
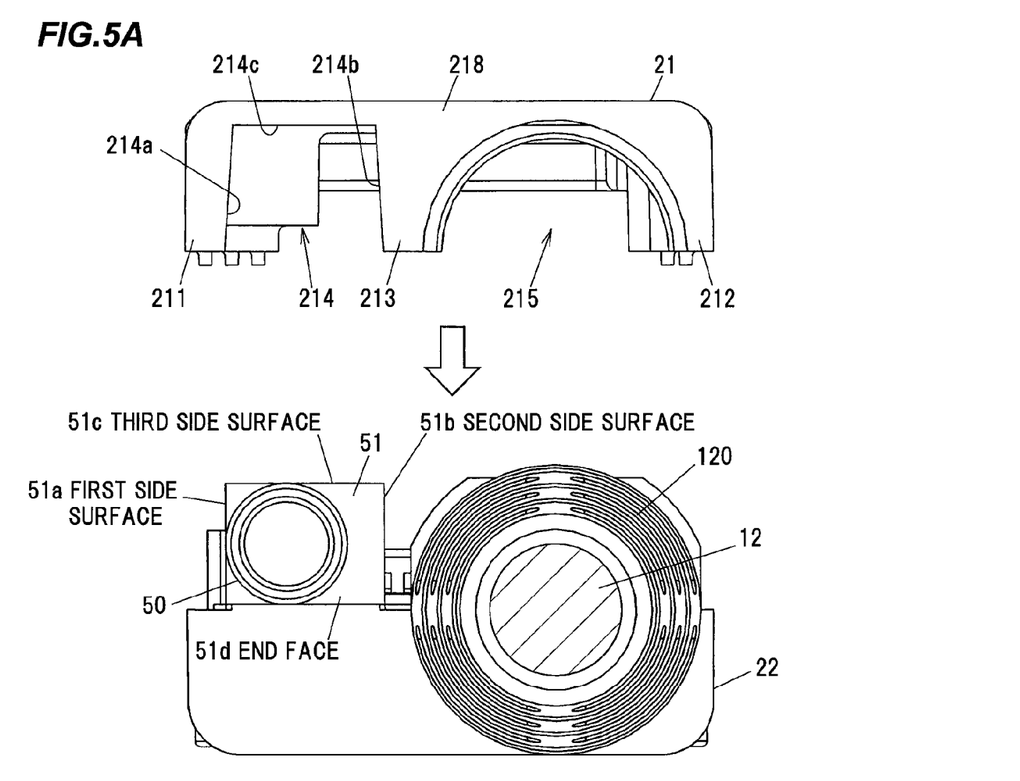
FIG. 5A shows a state before attaching the upper casing member and FIG. 5B shows a state in which the upper casing member is assembled with a lower casing member.
Figure 5B:
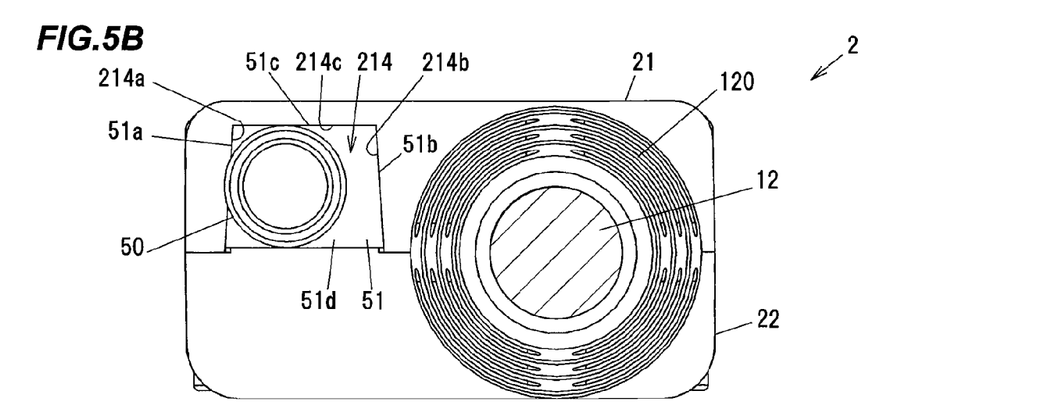
Figure 6:
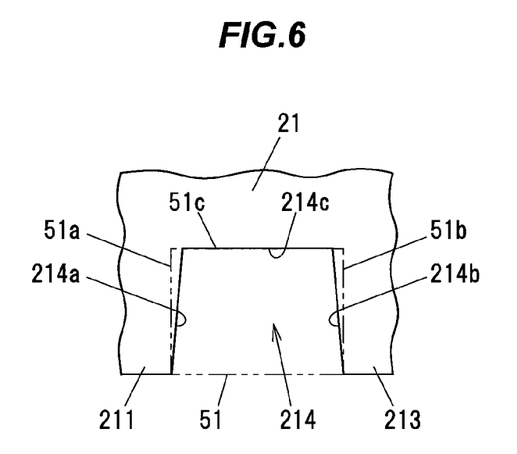
FIG. 6 is a schematic view showing a shape of a opening of the upper casing member and the periphery thereof.

FIGS. 5A and 5B are side views showing the photoelectric conversion device with connector 11 as viewed from the communication cable 12 side, wherein FIG. 5A shows a state before attaching the upper casing member 21 and FIG. 5B shows a state in which the upper casing member 21 is assembled with the lower casing member 22. FIG. 6 is a schematic view showing a shape of the opening 214 of the upper casing member 21 and the periphery thereof. Note that, the outline shape of the power connector 5 before attachment of the upper casing member 21 is indicated by a two-dot chain line in FIG. 6.

As shown in FIG. 5A, the lower casing member 22, on which the communication cable 12 and the circuit board 4 mounting the plural electronic components 40 as well as the power connector 5 are arranged, is assembled with the upper casing member 21. At this time, a first side surface 51a of the connector housing 51 at least partially comes in contact with the first inner surface 214a of the opening 214, a second side surface 51b of the connector housing 51 at least partially comes in contact with the second inner surface 214b of the opening 214, and a third side surface 51c of the connector housing 51 at least partially comes in contact with the third inner surface 214c of the opening 214. Note that, the third side surface 51c of the connector housing 51 does not need to be in contact with the third inner surface 214c of the opening 214. As shown in FIG. 5B, the power jack 50 of the power connector 5 and an end face 51d of the connector housing 51 having the power jack 50 are exposed to the outside.

Between the inner surfaces (the first inner surface 214a and the second inner surface 214b) of the opening 214 to be in contact with the side surfaces (the first side surface 51a and the second side surface 51b) of the power connector 5, a tapered shape is at least partially formed so that a dimension in a width direction parallel to the circuit board 4 decreases as the distance from the circuit board 4 increases. The distance between the first inner surface 214a and the second inner surface 214b is greater than the width of the connector housing 51 (a distance between the first side surface 51a and the second side surface 51b) at the end portion on the circuit board 4 side and is smaller than the width of the connector housing 51 at the end portion on the third inner surface 214c side. Alternatively, at the end portion on the circuit board 4 side, the distance between the first inner surface 214a and the second inner surface 214b may be the same as the width of the connector housing 51. Accordingly, the side surfaces (the first side surface 51a and the second side surface 51b) of the power connector 5 are pressed by the inner surfaces (the first inner surface 214a and the second inner surface 214b) of the opening 214 of the upper casing member 21.

The power connector 5 has the resin connector housing 51 which is pressed by the first inner surface 214a and the second inner surface 214b of the opening 214, and rigidity of the casing member 2 at both ends of the opening 214 in a width direction parallel to the circuit board 4 (rigidity of the first wall 211 and the third wall 213) is higher than rigidity of the connector housing 51. Therefore, at a portion of the opening 214 in which the distance between the first inner surface 214a and the second inner surface 214b is smaller than a widthwise dimension of the power connector 5 before attaching the upper casing member 21 as shown in FIG. 6, the connector housing 51 is compressed in a width direction by a pressing force applied from the first inner surface 214a and the second inner surface 214b.

Functions and Effects of the Embodiment

The following functions and effects are obtained in the embodiment.

(1) The first side surface 51a and the second side surface 51b are pressed by the first inner surface 214a and the second inner surface 214b of the opening 214 and the power connector 5 is supported on the casing member 2 by a frictional force generated by the pressing. This allows the casing member 2 to receive a portion of the force applied at the time of attaching/detaching the connector of the power cable to/from the power jack 50, thereby reducing load on the pair of connecting terminals 513 of the power connector 5. Therefore, it is possible to ensure electrical connection between the power connector 5 and the circuit board 4.

(2) Between the inner surfaces (the first inner surface 214a and the second inner surface 214b) of the opening 214 to be in contact with the side surfaces (the first side surface 51a and the second side surface 51b) of the power connector 5, a tapered shape is at least partially formed so that a dimension in a width direction parallel to the circuit board 4 decreases as the distance from the circuit board 4 increases. Therefore, it is easy to insert the connector housing 51 into the opening 214 and it is possible to support the power connector 5 on the casing member 2 without increasing man-hours for assembling the photoelectric conversion device with connector 11. In addition, since the first side surface 51a and the second side surface 51b of the connector housing 51 are pressed on the back side in the insertion direction of the power connector 5, the casing member 2 can reliably support the power connector 5.

(3) The power connector 5 has the resin connector housing 51 which is pressed by the first inner surface 214a and the second inner surface 214b of the opening 214, and the casing member 2 at both ends of the opening 214 in a width direction parallel to the circuit board 4 is (the first wall 211 and the third wall 213 are) formed of a member having a higher rigidity than the connector housing 51 (formed of a conductive metal member in the present embodiment). Therefore, the first side surface 51a and the second side surface 51b of the connector housing 51 are pushed and compressed by the first inner surface 214a and the second inner surface 214b of the opening 214. The first side surface 51a and the second side surface 51b of the connector housing 51 press the first inner surface 214a and the second inner surface 214b of the opening 214 back by a reaction force at the time of compression. This allows the casing member 2 to support the power connector 5 more reliably.

In addition, for example, the following modifications of the photoelectric conversion device with connector 11 in the embodiment can be implemented.

Modifications

Figure 7A:
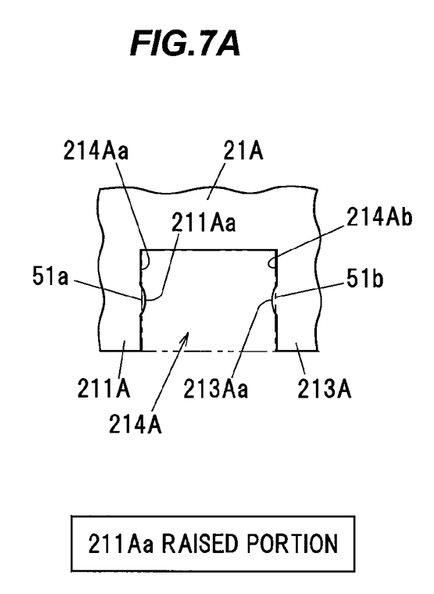
FIGS. 7A and 7B are schematic views showing shapes of openings of upper casing members and the periphery thereof in modifications of the invention.
Figure 7B:
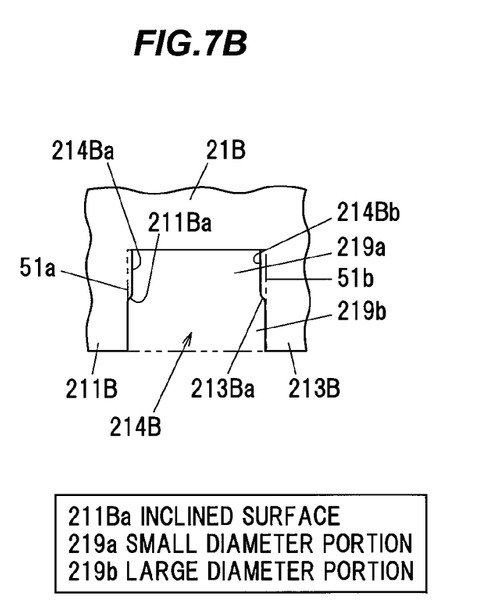

FIG. 7A is a schematic view showing a opening 214A of an upper casing member 21A and the periphery thereof in a modification of the invention, and FIG. 7B is a schematic view showing a shape of a opening 214B of an upper casing member 21B and the periphery thereof. Note that, the outline shape of the power connector 5 before attachment of the upper casing member 21A, 21B is indicated by a two-dot chain line in FIG. 7A, 7B.

The photoelectric conversion devices with connector 11 in the modifications have the same configuration as the photoelectric conversion device with connector 11 in the embodiment except that the shapes of the openings 214A and 214B of the upper casing members 21A and 21B and the periphery thereof are different from the shape of the opening 214 of the upper casing member 21 and the periphery thereof. Therefore, the members having the same functions are denoted by the common reference numerals and the overlapping explanation will be omitted.

As shown in FIG. 7A, a first wall 211A of the upper casing member 21A has a raised portion 211Aa formed on a first inner surface 214Aa side of the opening 214A. Likewise, a third wall 213A has a raised portion 213Aa formed on a second inner surface 214Ab side of the opening 214A. The raised portions 211Aa and 213Aa protrude toward the inside of the opening 214A and face each other.

The distance between the first inner surface 214Aa and the second inner surface 214Ab is smaller than the width of the connector housing 51 (a distance between the first side surface 51a and the second side surface 51b) at the portion with the raised portions 211Aa and 213Aa and is greater than the width of the connector housing 51 at the portion without the raised portions 211Aa and 213Aa. Alternatively, at the portion without the raised portions 211Aa and 213Aa, the distance between the first inner surface 214Aa and the second inner surface 214Ab may be the same as the width of the connector housing 51.

When the connector housing 51 is fitted to the opening 214A, the first side surface 51a and the second side surface 51b are pushed and compressed in a width direction by the raised portions 211Aa and 213Aa. The power connector 5 is thereby supported by the casing member 2.

As shown in FIG. 7B, the opening 214B of the upper casing member 21B has a small diameter portion 219a and a large diameter portion 219b. The distance between a first inner surface 214Ba and a second inner surface 214Bb is smaller than the width of the connector housing 51 (a distance between the first side surface 51a and the second side surface 51b) at the small diameter portion 219a and is greater than the width of the connector housing 51 at the large diameter portion 219b. Alternatively, at the large diameter portion 219b, the distance between the first inner surface 214B*a* and the second inner surface 214B*b* may be the same as the width of the connector housing 51.

In addition, an inclined surface 211B*a* is formed on the first inner surface 214B*a* between the small diameter portion 219*a* and the large diameter portion 219*b*. Likewise, the second inner surface 214B*b* has an inclined surface 213B*a* formed between the small diameter portion 219*a* and the large diameter portion 219*b*. Therefore, it is easy to insert the connector housing 51 into the opening 214B since the inclined surfaces 211B*a* and 213B*a* are formed.

When the connector housing 51 is fitted to the opening 214B, the first side surface 51*a* and the second side surface 51*b* are pushed and compressed in a width direction by the first inner surface 214B*a* and the second inner surface 214B*b* at the small diameter portion 219*a*. The power connector 5 is thereby supported by the casing member 2.

Functions and Effects of the Modifications

The same functions and effects as the functions and effects (1) to (3) described in the embodiment are obtained.

Summary of the Embodiment

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A connector supporting structure, comprising: a connector (power connector 5) that is mounted on a substrate (circuit board 4) and is supported by a casing (casing member 2) covering at least a portion of the substrate (circuit board 4), wherein the casing (casing member 2) comprises a opening (214/214A/214B) to expose a portion of the connector (power connector 5) from the inside of the casing (casing member 2) to the outside, and side surfaces (first side surface 51*a* and second side surface 51*b*) of the connector (power connector 5) are pressed by inner surfaces (first inner surface 214*a* and second inner surface 214*b*, first inner surface 214A*a* and second inner surface 214A*b*, first inner surface 214B*a* and second inner surface 214B*b*) of the opening (214/214A/214B).

[2] The structure described in the [1], wherein the connector (power connector 5) is compressed by a pressing force applied from the inner surfaces (first inner surface 214*a* and second inner surface 214*b*/first inner surface 214A*a* and second inner surface 214A*b*/first inner surface 214B*a* and second inner surface 214B*b*) of the opening (214/214A/214B).

The structure described in the [1] or [2], wherein, between the inner surfaces (first inner surface 214*a* and second inner surface 214*b*/first inner surface 214A*a* and second inner surface 214A*b*/first inner surface 214B*a* and second inner surface 214B*b*) of the opening (214/214A/214B) to be in contact with the side surfaces (first side surface 51*a* and second side surface 51*b*) of the connector (power connector 5), a tapered shape is at least partially formed so that a dimension in a width direction parallel to the substrate (circuit board 4) decreases as the distance from the substrate (circuit board 4) increases.

[4] The structure described in one of the [1] to [3], wherein the connector (power connector 5) comprises a resin connector housing (51) that is pressed by the inner surfaces (first inner surface 214*a* and second inner surface 214*b*/first inner surface 214A*a* and second inner surface 214A*b*/first inner surface 214B*a* and second inner surface 214B*b*) of the opening (214/214A/214B), and rigidity of the casing (casing member 2) at both ends of the opening (214/214A/214B) in a width direction parallel to the substrate (circuit board 4) is higher than rigidity of the connector housing (51).

[5] A connector-equipped electronic device (11), comprising: a substrate (circuit board 4) having a wiring pattern(s) formed thereon; an electronic component(s) (40) mounted on the substrate (circuit board 4); a connector (power connector 5) mounted together with the electronic component(s) (40) on the substrate (circuit board 4); and a casing (casing member 2) that comprises a pair of casing members (upper casing member 21/21A/21B and lower casing member 22) formed of a conductive metal member and houses the substrate (circuit board 4) and the electronic component(s) (40) in a housing space formed by fitting together the pair of casing members (upper casing member 21/21A/21B and lower casing member 22), wherein the casing (casing member 2) comprises a opening (214/214A/214B) to expose a portion of the connector (power connector 5) from the inside of the casing (casing member 2) to the outside, and side surfaces (first side surface 51*a* and second side surface 51*b*) of the connector (power connector 5) are pressed by inner surfaces (first inner surface 214*a* and second inner surface 214*b*, first inner surface 214A*a* and second inner surface 214A*b*, first inner surface 214B*a* and second inner surface 214B*b*) of the opening (214/214A/214B).

Although the embodiment of the invention has been described, the invention according to claims is not to be limited to the embodiment. Further, please note that all combinations of the features described in the embodiment are not necessary to solve the problem of the invention.

Appropriate modifications of the invention can be implemented without departing from the gist thereof. For example, although the connector housing 51 of the power connector 5 has a rectangular parallelepiped shape in the embodiment, the shape thereof is not limited. Therefore, the opening 214 of the upper casing member 21 only needs to have a shape adapted to press the side surfaces of the connector housing 51.

In addition, although the plural leg portions 511 of the power connector 5 are formed of a metal in the embodiment, it is not limited thereto. The same resin material as the connector housing 51 may be used to integrally form the leg portions 511 with the connector housing 51.

What is claimed is:

1. A connector supporting structure, comprising:
    a substrate;
    a connector mounted on the substrate; and
    a casing covering at least a portion of the substrate and supporting the connector,
        wherein the casing comprises an opening to expose a part of the connector from an inside of the casing to an outside,
        wherein side surfaces of the connector are pressed by inner surfaces of the opening, and
        wherein the inner surfaces of the opening are constructed such that a part thereof to contact the side surfaces of the connector comprises a tapered surface that a distance between the inner surfaces opposed in a direction parallel to the substrate decreases in a direction away from the substrate.

2. The structure according to claim 1, wherein the connector is compressed by a pressing force applied from the inner surfaces of the opening.

3. A connector supporting structure, comprising:
    a substrate;
    a connector mounted on the substrate; and
    a casing covering at least a portion of the substrate and supporting the connector, wherein the casing comprises an opening to expose a part of the connector from an inside of the casing to an outside, wherein side surfaces of the connector are pressed by inner surfaces of the opening, wherein the connector comprises a resin connector housing to be pressed by the inner surfaces of the opening, and wherein a rigidity of the casing at both ends of the opening in a direction parallel to the substrate is higher than that of the connector housing.

4. A connector-equipped electronic device, comprising:

a substrate with a wiring pattern formed thereon;

an electronic component mounted on the substrate;

a connector mounted on the substrate; and a casing covering at least a portion of the substrate and supporting the connector, wherein the casing comprises an opening to expose a part of the connector from an inside of the casing to an outside, wherein side surfaces of the connector are pressed by inner surfaces of the opening, and wherein the inner surfaces of the opening are constructed such that a part thereof to contact the side surfaces of the connector comprises a tapered surface that a distance between the inner surfaces opposed in a direction parallel to the substrate decreases in a direction away from the substrate.

* * * * *